Oct. 30, 1956     B. H. KRYZER     2,768,750
DISTRIBUTOR FOR WATER TREATMENT AND FILTER TANKS
Filed Jan. 14, 1954
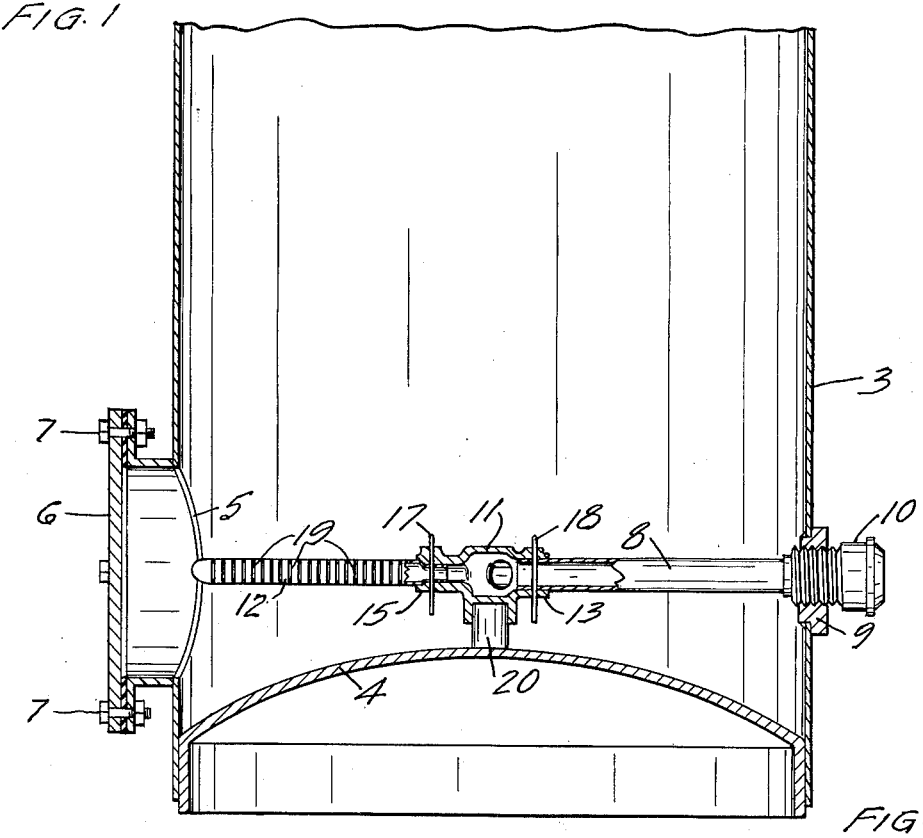
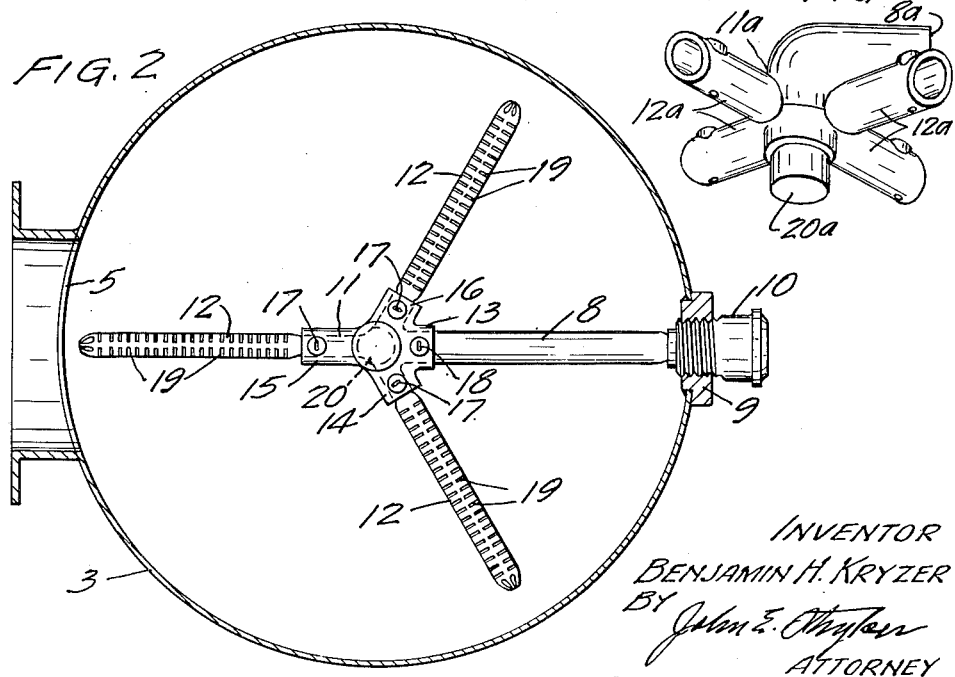
INVENTOR
BENJAMIN H. KRYZER
BY
John E. ———
ATTORNEY United States Patent Office 2,768,750
Patented Oct. 30, 1956

2,768,750

DISTRIBUTOR FOR WATER TREATMENT AND FILTER TANKS

Benjamin H. Kryzer, St. Paul, Minn., assignor to The Lindsay Company, St. Paul, Minn., a corporation of Minnesota Application January 14, 1954, Serial No. 404,036

1 Claim. (Cl. 210—94)

In liquid treatment tanks containing granular, flocculent or other particulate or porous materials through which water or other liquids are filtered it is usually desirable to afford fairly uniform horizontal distribution of rising or descending currents or both rising and descending currents. Such distribution is important, for example, in water softeners of the base exchange type wherein the particles of softening material are light enough to form channels readily when water is caused to flow either downwardly to or upwardly from a pipe communicating with the lower portion of the tank. Closed or pressure type treatment tanks of the larger sizes seldom have access openings which are large enough to permit the installation as a single unit of a distributor of the required width. In tanks of the smaller diameters it is feasible to obtain proper distribution to or from a single straight, strainer-like pipe projecting interiorly from a side or bottom opening, but for closed tanks of the larger diameters it is necessary to provide either a number of suitably spaced pipe connections with the tank or a single external connection arranged to supply a plurality of branching distributor tubes within the lower portion of the tank.

The present invention relates to the latter type of distributor for the larger closed tanks and has for its principal objects to provide such a distributor which is easy to assemble and install in the restricted space available in the tank and one which is efficient and inexpensive as compared with distributors of the multiple unit type having an opening in the tank bottom or side wall for each unit.

My invention also includes certain other novel features of construction which will be more fully pointed out in the following specification and claim.

Referring to the accompanying drawing which illustrates, by way of example and not for the purpose of limitation, a preferred embodiment of my invention:

Figure 1 is a fragmentary vertical sectional view through the lower portion of a tank of common type, showing one of my improved distributors in place therein, a portion of the distributor being shown in vertical section and a portion in side elevation;

Fig. 2 is a horizontal sectional view through the tank, showing the distributor in top plan view, and Fig. 3 is a perspective view showing a modified form of the branch fitting for the distributor.

In the drawing, the tank which is one of the closed or pressure type is shown with cylindrical side walls 3, a bottom wall 4 and an access opening 5 formed in the wall 3 at an elevation somewhat above the bottom wall 4. The opening 5 is provided with a removable closure member 6 which may be secured in closed position by bolts 7 or other suitable fastening means.

Communicating centrally with the lower portion of the tank 3 at approximately the elevation of the opening 5 is a liquid conduit or pipe 8 which projects from and through an opening in the tank. An internally threaded bushing 9 is welded to the tank wall and the pipe 8 is fixed at its outer end to a suitable fitting 10, e. g., one of the members of a union of common type which is threaded in the bushing 9.

My improved distributor is adapted to be assembled within the lower portion of the tank by an operator working through the opening 5 and to be detachably connected to the inner end of the pipe 8 quickly and easily. The distributor comprises a branch fitting, indicated generally by the numeral 11, and a plurality of strainer tubes 12 detachably connected to and projecting substantially radially from the fitting 11 at regularly spaced intervals. The fitting 11 is formed with a branch 13 connected to the pipe 8 and smaller branches 14, 15 and 16 severally connected to the strainer tubes 12 in communication therewith. All of the connections are of the smooth contact surface sliding telescope type (without threads) and the tubes are held in place by cotter keys or pins 17 which fit in drill holes extending transversely through the several branches of the fitting 11 and tubes 12. Another pin 18 is provided to fasten the fitting 11 to the inner end portion of the pipe 8, these members having inter-engaging smooth telescoping surfaces.

Each of the tubes 12 is formed with a multiplicity of openings 19 preferably having the form of elongated slots extending through the walls of the tubes in planes perpendicular to the axes thereof. As will be evident from Fig. 2, the several strainer tubes 12 diverge radially from the axis of the tank and are equally spaced in a horizontal plane through the axis. Projecting from the bottom of the fitting 11 is a short supporting member 20 which rests on the bottom wall 4 and is preferably constructed from a suitable dielectric material.

To install my improved distributor in the lower portion of the tank, the pipe 8 is first inserted through the opening in the bushing 9 and secured in place together with the fitting member 10 by means of the inter-engaging bushing and fitting threads. With the closure 6 removed the branch fitting 11 and strainer tubes 12 are inserted through the opening 5 and assembled together by an operator working through this opening. An end of each strainer tube is merely inserted in its fitting socket and held in place by inserting a pin 17 while the fitting is detached from the pipe 8. After assembling the fitting 11 with the strainer tubes, the assembly is attached to the pipe 8 merely by slipping the branch 13 of the fitting over the inner end of the pipe 8 and inserting the pin 18. By providing such slip type joints I make it unnecessary to rotate the tubes relative to the fitting or to rotate the assembly relative to the pipe 8, as would be required with threaded joint members, and the work required to assemble the distributor is minimized.

Four or more strainer tubes may be provided as branches of the central fitting to obtain any required distribution of liquid in tanks of various sizes. Thus strainer tubes of any required length may be arranged to radiate from a central fitting having a suitable number of branches. For example, as shown in Fig. 3, where four or more branches are required, a branch 8a of the central fitting 11a for attachment to the pipe 8 may be located at a different elevation from branches 12a which are to be connected to the several strainer tubes 12 and the fitting may be supported on a member 20a to space it from the tank bottom.

It will be understood that the upper portion of the tank (not shown) is usually closed except for one or more pipe connections for introducing or withdrawing liquids. In operation, with the closure 6 for the opening 5 secured in place on the tank, and with a body of solid treating material in the tank, water or other liquid may be either withdrawn from the tank through the strainer tubes 12 and pipe 8 or fed into the tank through the tubes and pipe.

In either case a desirable distribution of flow throughout the body of solid treating material in the tank is obtained.

I claim:

In combination with a tank having an imperforate bottom wall, cylindrical side walls and a liquid conduit projecting substantially horizontally into the lower portion of the tank from one side, said conduit having an open inner end adjacent to the axis of the tank, said tank being formed with an access opening approximately at the elevation of the inner end of said conduit, a distributor comprising a multiple branch fitting adapted to be inserted into the tank through said opening and to be connected to the inner end of said conduit in communication therewith, said fitting having a plurality of angularly spaced branch openings, a plurality of elongated strainer tubes adapted to be inserted separately from said fitting into the tank through said opening and to extend substantially radially from said fitting within the tank in communication with said branch openings respectively, said fitting, tubes and pipe being formed with telescoping slip joint members, cross pins for connecting said fitting to said pipe and the several tubes to said fitting, said access opening being sufficiently large to permit the joining of said fitting to said conduit and the joining of said strainer tubes to said fitting within the tank by working through said opening, and means projecting downward from said fitting for supporting the distributor centrally on said bottom wall.

References Cited in the file of this patent

UNITED STATES PATENTS

| | | |
|---|---|---|
| 442,158 | West | Dec. 9, 1890 |
| 478,261 | Jewell | July 5, 1892 |
| 595,182 | Lardner, et al. | Dec. 7, 1897 |
| 636,356 | Randall | Nov. 7, 1899 |
| 1,276,665 | Leopold | Aug. 20, 1918 |
| 1,381,663 | Roeder | June 12, 1921 |
| 1,588,336 | Richmond | June 8, 1926 |
| 1,638,230 | Alsaker | Aug. 9, 1927 |
| 1,692,939 | Johnson | Nov. 27, 1928 |
| 2,467,433 | King | Apr. 19, 1949 |